(12) United States Patent
Andres et al.

(10) Patent No.: US 11,209,077 B2
(45) Date of Patent: Dec. 28, 2021

(54) INTER-AXLE DIFFERENTIAL ASSEMBLY

(71) Applicant: Dana Heavy Vehicle Systems Group, LLC, Maumee, OH (US)

(72) Inventors: Gregory R. Andres, Blissfield, MI (US); Akash A. Aware, Pune (IN); Prashant L. Chaudhari, Pune (IN); Vijay D. Kadam, Pune (IN); Sandeep G. Nargide, Pune (IN); Jared T. Reichert, Pemberville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/990,332

(22) Filed: Aug. 11, 2020

(65) Prior Publication Data

US 2021/0048094 A1  Feb. 18, 2021

Related U.S. Application Data

(60) Provisional application No. 62/885,332, filed on Aug. 12, 2019.

(30) Foreign Application Priority Data

Dec. 12, 2019 (IN) .............................. 201911051480

(51) Int. Cl.
| | |
|---|---|
| *F16H 48/38* | (2012.01) |
| *F16H 48/28* | (2012.01) |
| *F16H 57/023* | (2012.01) |
| *F16H 57/037* | (2012.01) |
| *F16H 48/24* | (2006.01) |

(52) U.S. Cl.
CPC ............. *F16H 48/28* (2013.01); *F16H 48/38* (2013.01); *F16H 57/023* (2013.01); *F16H 57/037* (2013.01); *F16H 48/24* (2013.01)

(58) Field of Classification Search
CPC .... F16H 48/40; F16H 48/08; F16H 2048/085; F16H 48/00–2048/426; B60K 17/346
USPC ......................................................... 475/243
See application file for complete search history.

(56) References Cited

U.S. PATENT DOCUMENTS

| | | | | |
|---|---|---|---|---|
| 1,888,884 A | * | 11/1932 | Omer ...................... | F16H 48/08 475/237 |
| 2,548,258 A | * | 4/1951 | Griffith ................... | F16H 48/08 475/245 |

(Continued)

FOREIGN PATENT DOCUMENTS

| | | | | |
|---|---|---|---|---|
| CA | 2280543 | | 3/2000 | |
| GB | 190914547 A | * | 6/1910 | ............. F16H 48/08 |

*Primary Examiner* — Sherry L Estremsky
(74) *Attorney, Agent, or Firm* — Marshall & Melhorn, LLC

(57) ABSTRACT

An inter-axle differential (IAD) assembly including a unitary IAD case having one or more spaced-apart apertures extending therethrough, wherein each of the IAD case apertures defines a groove, and a spider having a plurality of radially, outwardly extending legs, wherein one or more of the legs include an opening at an outward end thereof, and wherein each IAD case apertures are aligned with each of the leg openings. The IAD assembly further includes a locking mechanism having one or more fastening elements, wherein the fastening elements are selectively inserted through the IAD case apertures and into the one or more leg openings and/or into the grooves of the IAD case apertures.

16 Claims, 9 Drawing Sheets

(56) References Cited

U.S. PATENT DOCUMENTS

| | | | | |
|---|---|---|---|---|
| 2,742,684 A | * | 4/1956 | Rising | B60K 17/36 |
| | | | | 475/237 |
| 2,991,664 A | * | 7/1961 | Bernotas | F16H 48/34 |
| | | | | 475/86 |
| 3,264,900 A | * | 8/1966 | Hartupee | F16H 48/08 |
| | | | | 475/231 |
| 3,505,904 A | * | 4/1970 | Williams, Jr. | B60K 17/344 |
| | | | | 74/665 G |
| 3,814,201 A | | 6/1974 | O Brien | |
| 3,848,691 A | * | 11/1974 | Dolan | F16H 48/30 |
| | | | | 180/250 |
| 4,381,828 A | | 5/1983 | Lunn | |
| 4,491,035 A | | 1/1985 | Gleasman | |
| 4,543,854 A | * | 10/1985 | Roth | F16H 48/08 |
| | | | | 475/230 |
| 5,304,103 A | | 4/1994 | Schlosser | |
| 5,404,963 A | | 4/1995 | Crepas | |
| 5,584,777 A | * | 12/1996 | Sander | F16H 48/08 |
| | | | | 475/230 |
| 5,647,814 A | * | 7/1997 | Krisher | F16H 48/08 |
| | | | | 475/230 |
| 5,718,653 A | * | 2/1998 | Showalter | B60K 17/3467 |
| | | | | 475/230 |
| 5,823,908 A | * | 10/1998 | Stefanek | F16H 48/08 |
| | | | | 475/230 |
| 6,027,423 A | | 2/2000 | Bell | |
| 6,190,281 B1 | | 2/2001 | Oates | |
| 6,814,683 B2 | * | 11/2004 | Krzesicki | F16H 48/08 |
| | | | | 475/230 |
| 7,211,017 B2 | | 5/2007 | Green | |
| 7,367,914 B2 | | 5/2008 | Rosochacki | |
| 7,470,207 B2 | | 12/2008 | Todd | |
| 7,479,086 B2 | | 1/2009 | Veldman | |
| 7,758,462 B2 | | 7/2010 | Veldman | |
| 8,360,921 B2 | * | 1/2013 | Finkenzeller | F16H 48/08 |
| | | | | 475/230 |
| 8,398,520 B1 | * | 3/2013 | Bassi | B60K 23/08 |
| | | | | 475/221 |
| 8,651,994 B2 | | 2/2014 | Bassi | |
| 8,851,212 B2 | | 10/2014 | Kahl | |
| 10,001,201 B2 | | 6/2018 | Martin | |
| 2007/0238572 A1 | | 10/2007 | Todd | |
| 2016/0341260 A1 | | 11/2016 | Hirao | |
| 2017/0146072 A1 | | 5/2017 | Siddarammappa | |
| 2018/0259051 A1 | * | 9/2018 | Chinitz | B60K 23/04 |
| 2018/0259052 A1 | | 9/2018 | Chinitz | |
| 2018/0283465 A1 | | 10/2018 | Hirao | |
| 2019/0113119 A1 | | 4/2019 | Keeney | |
| 2019/0176619 A1 | | 6/2019 | Ingesson | |
| 2020/0127533 A1 | | 4/2020 | Hung | |

\* cited by examiner

INTER-AXLE DIFFERENTIAL ASSEMBLY

CROSS-REFERENCE TO RELATED APPLICATIONS

The present application claims the benefit to U.S. Provisional Patent Application Ser. No. 62/885,332, filed Aug. 12, 2019, and Indian Non-Provisional Patent Application No. 201911051480, filed Dec. 12, 2019, which are incorporated herein by reference in their entirety.

FIELD

The present disclosure relates to an inter-axle differential (IAD) assembly, and more particularly to an IAD assembly including a locking mechanism for an IAD case.

BACKGROUND

Tandem axle assemblies comprise a forward axle and a rear axle and are widely used on trucks and other load-carrying vehicles. Typically, both axles are driven, but in some cases, only one axle is driven. The tandem axle assembly may be designated a 6×4 tandem axle assembly when the forward axle and rear axle are drivingly engaged. The tandem axle assembly may be designated a 6×2 tandem axle assembly when either one of the forward or the rear axle is drivingly engaged.

Tandem axle assemblies commonly include an inter-axle differential (IAD) assembly with a gear system for distributing torque between the forward axle and the rear axle. Components of an IAD assembly, such as the gear system, are surrounded by an IAD case. Conventional IAD cases, however, are difficult to assemble, lack proper balance, and present packaging constraints. In some instances, the IAD cases fail to remain securely positioned during operation of tandem axle assemblies. As a result, the IAD cases move and rub against adjacent gears, such as output side gears and input helical gears, for example, causing premature damage thereto. In addition, the packaging constraints and serviceability problems are created from the IAD cases that fail to securely maintain their positions in IAD assemblies.

It would therefore be advantageous to develop an IAD assembly having a locking mechanism configured to maintain a position of an IAD case within the IAD assembly.

SUMMARY

In concordance and agreement with the present disclosure, an IAD assembly having a locking mechanism configured to maintain a position of an IAD case within the IAD assembly, has surprisingly been discovered.

In one embodiment, an inter-axle differential (IAD) assembly, comprises: a case; a spider disposed within the case, the spider having a plurality of outwardly extending legs; a plurality of gears disposed within the case, wherein at least one of the gears is disposed on at least one of the legs of the spider; and at least one locking mechanism configured to maintain a position of the IAD case.

In another embodiment, an inter-axle differential (IAD) assembly, comprises: a case having at least one aperture extending therethrough; a spider disposed within the case, the spider having a plurality of outwardly extending legs, wherein at least one of the legs includes at least one opening formed in an outward end thereof; a plurality of gears disposed within the case, wherein at least one of the gears is disposed on at least one of the legs of the spider; and at least one locking mechanism configured to maintain a position of the IAD case, wherein the at least one locking mechanism includes a fastening element, and wherein the fastening element is at least partially disposed in the at least one aperture formed in the case and the at least one opening formed in the spider.

In yet another embodiment, a method of assembling an inter-axle differential (IAD) assembly, the method comprises: providing a case; providing a spider having a plurality of outwardly extending legs; providing a plurality of gears; providing at least one locking mechanism configured to maintain a position of the IAD case; disposing at least one of the gears on at least one of the legs of the spider; positioning the spider having the gears disposed on the legs thereof within the case; and securing the case to the spider using the at least one locking mechanism.

As aspects of certain embodiments, the at least one locking mechanism secures the IAD case to the spider.

As aspects of certain embodiments, the case includes at least one aperture formed therein to receive at least a portion of the at least one locking mechanism therethrough.

As aspects of certain embodiments, at least one of the legs of the spider includes an opening formed therein to receive at least a portion of the at least one locking mechanism therein.

As aspects of certain embodiments, the locking mechanism includes a fastening element configured to be received in at least one of the case and the spider.

As aspects of certain embodiments, the fastening element is one of a threaded fastener, a dowel, a pin, and a rod.

As aspects of certain embodiments, the fastening element is connected to the case by a weld.

As aspects of certain embodiments, the locking mechanism further includes a retaining element configured to maintain a position of the fastening element.

As aspects of certain embodiments, the retaining element is one of a retaining ring, a locking ring, a snap ring, a clamp, a latch, a strap, a clip, a snap cap, and a closing plate.

As aspects of certain embodiments, the locking mechanism further includes a locker to militate against disengagement of the locking mechanism.

As aspects of certain embodiments, the case is a unitary structure.

As aspects of certain embodiments, the case further includes a groove formed in an inner surface defining the at least one aperture.

As aspects of certain embodiments, the method further comprises welding the fastening element to the case.

As aspects of certain embodiments, the method further comprises applying a locker to militate against disengagement of the locking mechanism.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

Figure 1:
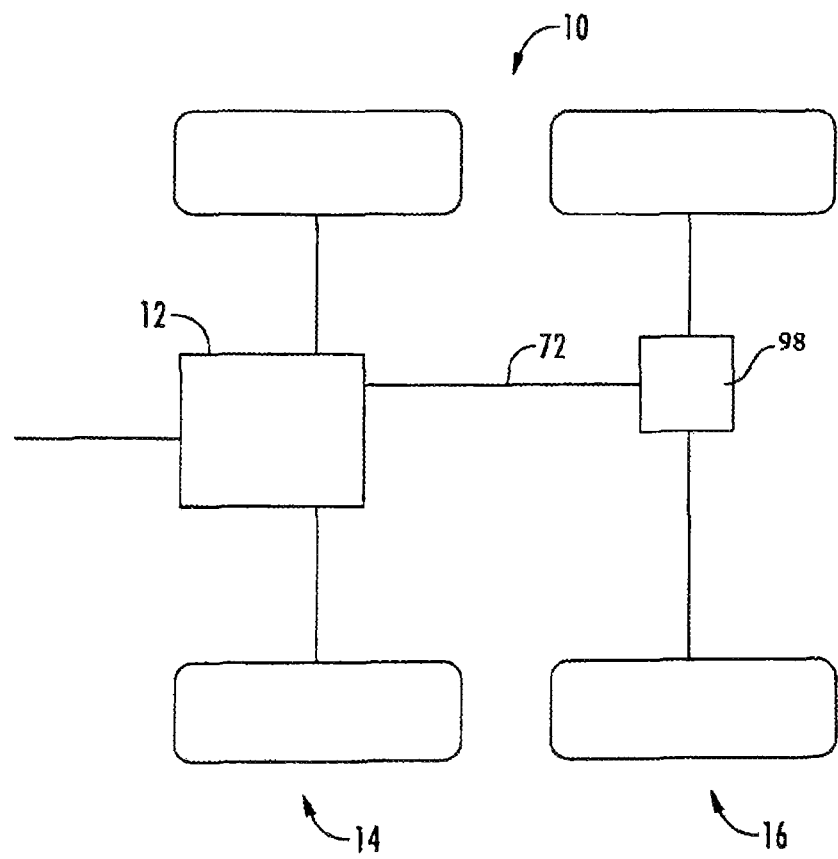
FIG. 1 is a schematic view of a tandem axle assembly including an inter-axle differential (IAD) assembly according to an embodiment of the disclosure.

FIG. 1 is a schematic view of a tandem axle assembly 10 including an IAD assembly 12, a forward axle assembly 14, and a rear axle assembly 16 according to an embodiment of the disclosure. The forward axle assembly 14 and the rear axle assembly 16 are in selective driving arrangement with the IAD assembly 12. In an embodiment shown in FIG. 1, the IAD assembly 12 may be positioned on the forward axle assembly 14. In an alternative embodiment, the IAD assembly 12 may be positioned on the rear axle assembly 16. It should be appreciated that the IAD assembly 12 may be positioned at other locations on the tandem axle assembly 10 as desired.

Figure 2:
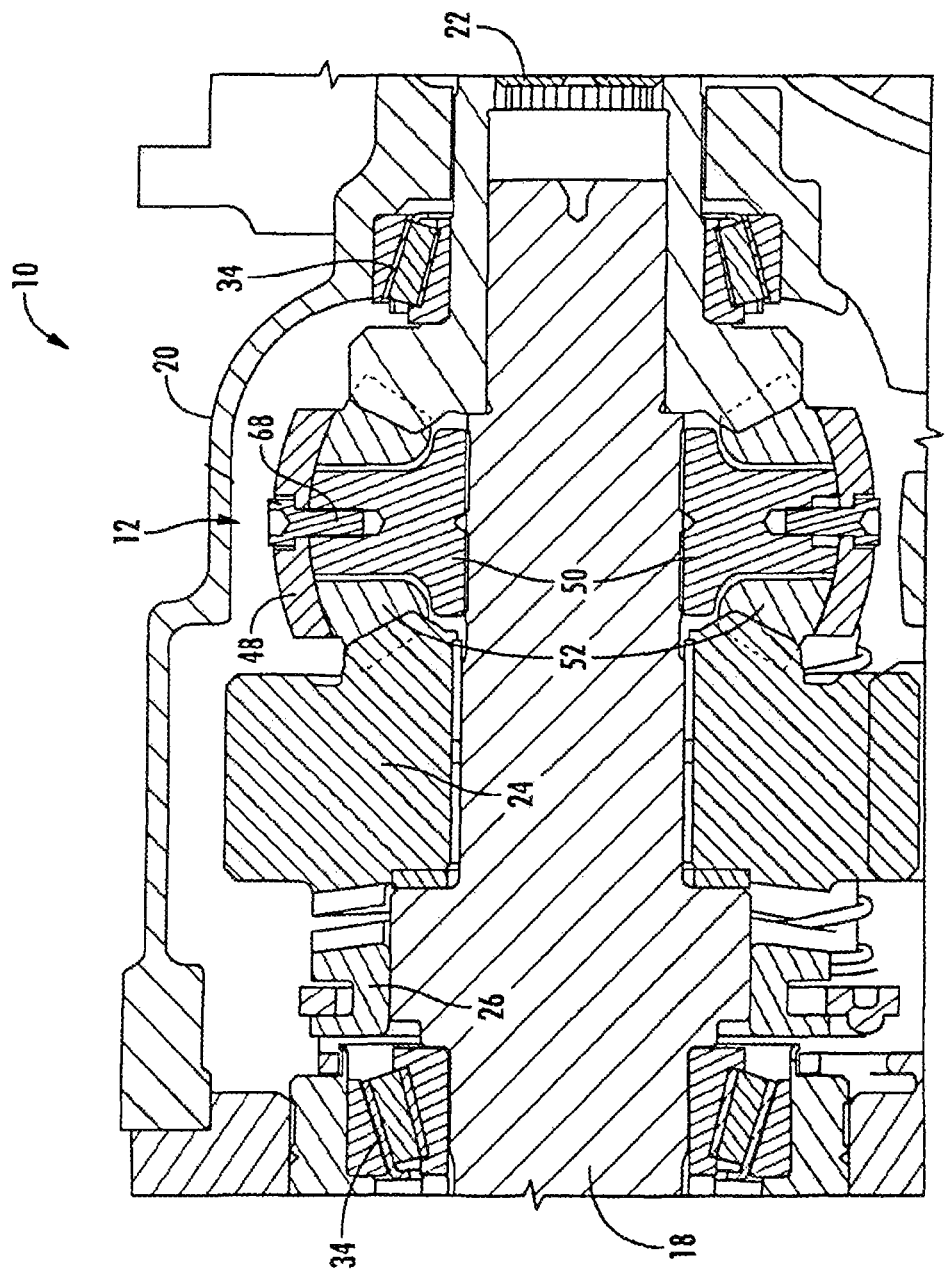
FIG. 2 is a schematic fragmentary cross-sectional view of a portion of the tandem axle assembly illustrated in FIG. 1.

As shown in FIGS. 1 and 2, rotational energy is provided to the tandem axle assembly 10 through an input shaft 18 that is rotated by an engine or a prime mover (not shown). The IAD assembly 12 is configured to split the torque generated by the input shaft 18 between the forward axle assembly 14 and the rear axle assembly 16. The rear axle assembly 16 may comprise an axle differential 98. The rear axle assembly 16 may be in driving engagement with an output shaft 22 through a cardan shaft 72.

Figure 3:
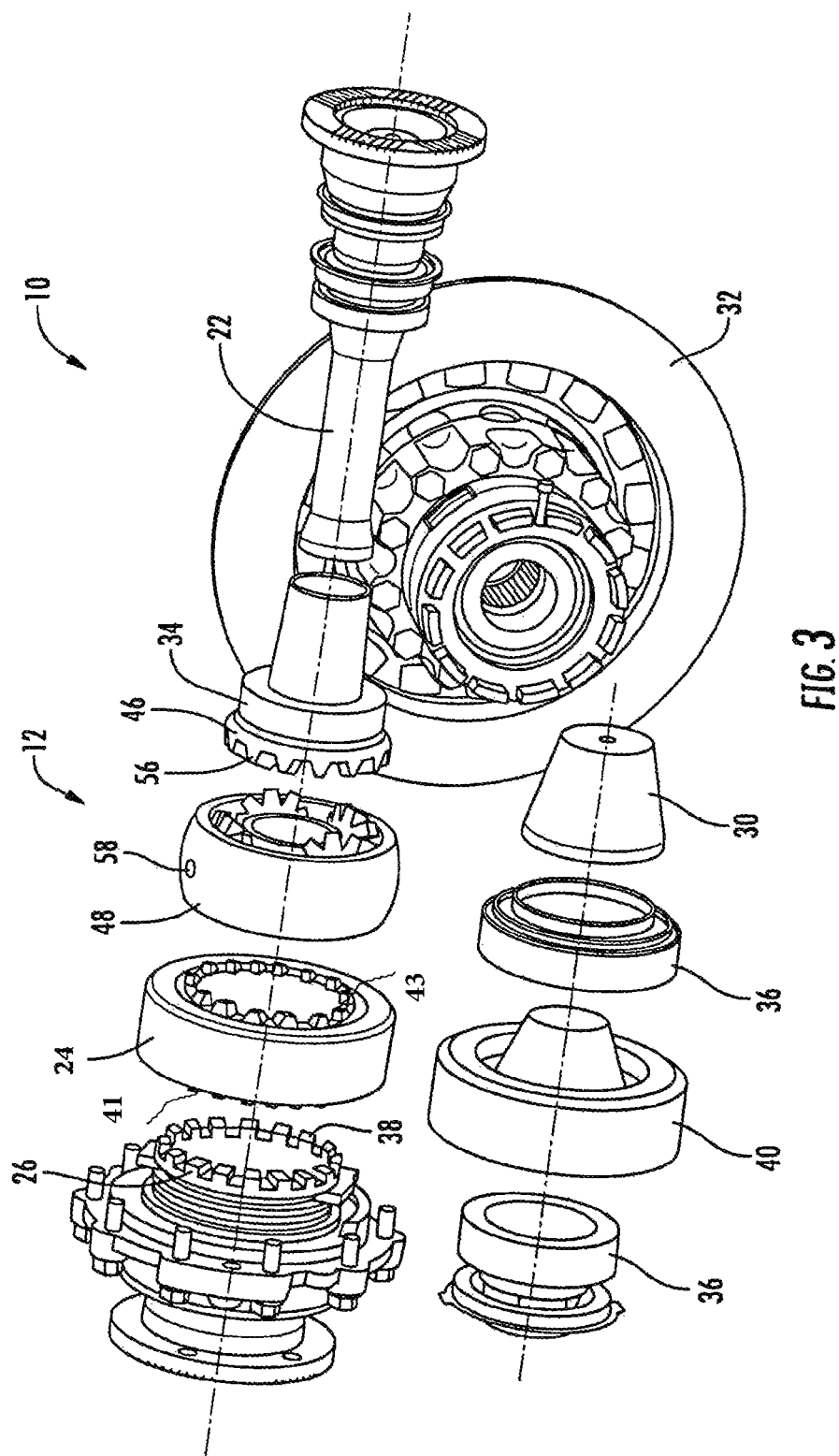
FIG. 3 is a schematic exploded perspective view of a portion of the tandem axle assembly illustrated in FIGS. 1 and 2.

As seen in FIGS. 2 and 3, the tandem axle assembly 10 also includes an axle housing 20, the input shaft 18, the output shaft 22, a helical side gear assembly 24, a clutch assembly 26, one or more output side gears 46, a drive pinion 30, a ring gear 32, one or more input bearings 34, and one or more pinion bearings 36.

The axle housing 20 has a size and a shape to receive and retain various components of the tandem axle assembly 10 therein. The input shaft 18 extends into a hollow interior of the axle housing 20. The input shaft 18 may be rotatably supported by one or more of the input bearings 34 that may be disposed in the axle housing 20. As shown in FIG. 2, the input shaft 18 may be operatively connected to the IAD assembly 12. The input shaft 18 may include a plurality of splines arranged around and axial extending along a longitudinal axis of the input shaft 18. In certain embodiments, the splines of the input shaft 18 are configured to cooperate with a plurality of splines formed on the clutch assembly 26. More preferably, the splines are formed on an inner surface of the clutch assembly 26.

In the embodiment shown, the clutch assembly 26 may be a curvic clutch including a sliding collar having a plurality of teeth 38 formed thereon. The clutch assembly 26 may be selectively engaged with the helical side gear assembly 24, wherein both the clutch assembly 26 and the helical side gear assembly 24 are coaxial with the input shaft 18. In certain embodiments, the teeth 38 arranged on a face of the sliding collar of the clutch assembly 26 may meshingly engage with teeth 41 arranged on a face of the helical side gear assembly 24 opposite the IAD assembly 12. The teeth 41 of the helical side gear assembly 24 may have the same configuration or similar configuration as the teeth 38 of the sliding collar of the clutch assembly 26. It should be appreciated that the sliding collar of the clutch assembly 26 and the helical side gear assembly 24 may have any shape, size, and number of teeth as desired.

In one embodiment, the helical side gear assembly 24 may include a center bore configured to receive the input shaft 18 and a bearing configured to receive the input shaft 18 and that may rotatably support the helical side gear assembly 24. The bearing, if provided, may allow the helical side gear assembly 24 to rotate about or with respect to the input shaft 18 under certain operating conditions.

An outer circumferential surface of the helical side gear assembly 24 may include a plurality of teeth configured to meshingly engage a plurality of teeth formed on a pinion helical gear 40. In an embodiment, the pinion helical gear 40 is disposed on a pinion shaft (not depicted) of the drive pinion 30 that is positioned parallel with the input shaft 18, but may be spaced apart from the input shaft 18, if desired. The drive pinion 30 may be mounted for rotation on one or more of the pinion bearings 36. The pinion bearings 36 may be positioned on either side of the pinion helical gear 40 on the pinion shaft. The drive pinion 30 may be directly connected to and provide torque to the ring gear 32.

The helical side gear assembly 24 may be drivingly connected to the IAD assembly 12. In certain embodiments, the helical side gear assembly 24 includes a plurality of teeth 43 arranged on a face of the helical side gear assembly 24 opposite the clutch assembly 26 and facing toward the IAD assembly 12. It is understood that the teeth 43 of the helical side gear assembly 24 facing the IAD assembly 12 may have a different configuration than the teeth 41 facing the clutch assembly 26. It is further understood that the helical side gear assembly 24 may have any size, shape, and number of teeth 43 facing the IAD assembly 12 as desired.

As illustrated in FIG. 2, the helical side gear assembly 24, the clutch assembly 26, the IAD assembly 12, and the output side gear 46 are all interposed between the input bearings 34. In an embodiment, the clutch assembly 26 may be supported on the input shaft 18 and the output side gear 46 may rotatably support one of the input bearings 34. The output side gear 46 may be disposed proximate the input shaft 24.

In certain embodiments, the output side gear 46 may extend along the longitudinal axis of the input shaft 18 and include a center bore configured to receive and support an end of the input shaft 18. A bearing (not depicted) may be provided in the center bore between the input shaft 18 and the output side gear 46 to facilitate alignment and rotation. The output side gear 46 may also include a plurality of splines formed in a surface defining the center bore. The splines of the output side gear 46 may be spaced apart from the end of the input shaft 18 and configured to engage a plurality of corresponding splines formed on another shaft, such as the output shaft 22.

In certain embodiments, the IAD assembly 12 may operatively connect the input shaft 18 to the output shaft 22. The IAD assembly 12 divides rotational drive from the input shaft 18 between the helical side gear assembly 24 and the output side gear 46. As shown in FIGS. 2 and 4-6, the IAD assembly 12 includes an IAD case 48, a spider 50, a plurality of pinion gears 52, a locking mechanism 54, and the output side gear 46. The IAD case 48 may be configured to at least partially receive components of the IAD assembly 12. In one embodiment, the IAD case 48 is configured as a unitary or a one-piece component. In other embodiments, the IAD case 48 may be configured from multiple components.

Figure 4:
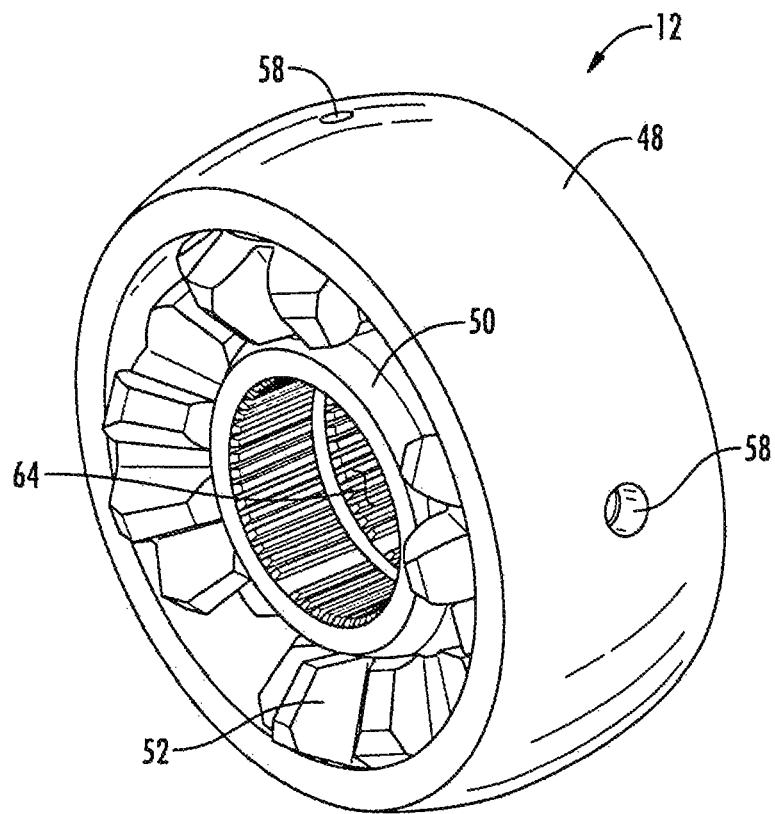
FIG. 4 is a schematic perspective view of a portion of an IAD assembly according to another embodiment of the disclosure.

As illustrated in FIGS. 3 and 4, the IAD case 22 may include one or more apertures 58 formed therein and extending therethrough. In one embodiment, the IAD case 22 has two apertures 58 spaced opposingly apart, wherein the apertures 58 are spaced about 180 degrees from each other. It is understood that there may be more than two apertures 58 extending through the IAD case 22 and that the apertures 58 may be spaced apart at less than or greater than 180 degrees from each other. In another embodiment shown, the IAD case 48 has four apertures 58, wherein the apertures 58 are spaced apart about 90 degrees from each other. It is further understood that the IAD case 48 may include any number and size of apertures 58 formed therein and that the apertures 58 may be spaced apart at various distances as desired. As more clearly shown in FIG. 5, each of the apertures 58 may include a groove 80 formed in an inner surface thereof.

As shown in FIG. 2, the pinion gears 52 are at least partially disposed in the IAD case 48. In one embodiment, the IAD assembly 12 includes four pinion gears 52. In other embodiments, the IAD assembly 12 may include either more or less than four pinion gears 52. The pinion gears 52 may be meshingly engaged with a portion of the helical side gear assembly 24 on one side of the IAD assembly 12 and the same pinion gears 52 may be meshingly engaged with a portion of the output side gear 46 on an opposing side of the IAD assembly 12. In certain embodiments, the pinion gears 52 are meshingly engaged with the teeth 43 arranged on the face of the helical side gear assembly 24 and meshingly engaged with a plurality of teeth 56 formed on an outer surface of the output side gear 46. Each of the pinion gears 52 may include a center bore configured to receive a portion of the spider 50 therein.

The spider 50 may be fixedly coupled with the input shaft 18 to facilitate torque transfer from the input shaft 18 to the IAD assembly 12. In certain embodiments, the spider 50 includes a substantially ring-shaped body 60 having a center bore 64 formed therein. The center bore 64 may have a plurality of splines formed on an inner surface defining the center bore 64. It is understood that the spider 50 may have any suitable shape, size, and configuration as desired. The splines of the spider 50 may be configured to engage a plurality of corresponding splines formed on the input shaft 18 to align and secure the spider 50 to the input shaft 18 for rotation therewith. As shown in FIG. 2, the spider 50 is spaced apart from and does not engage with the output shaft 22.

Figure 6:
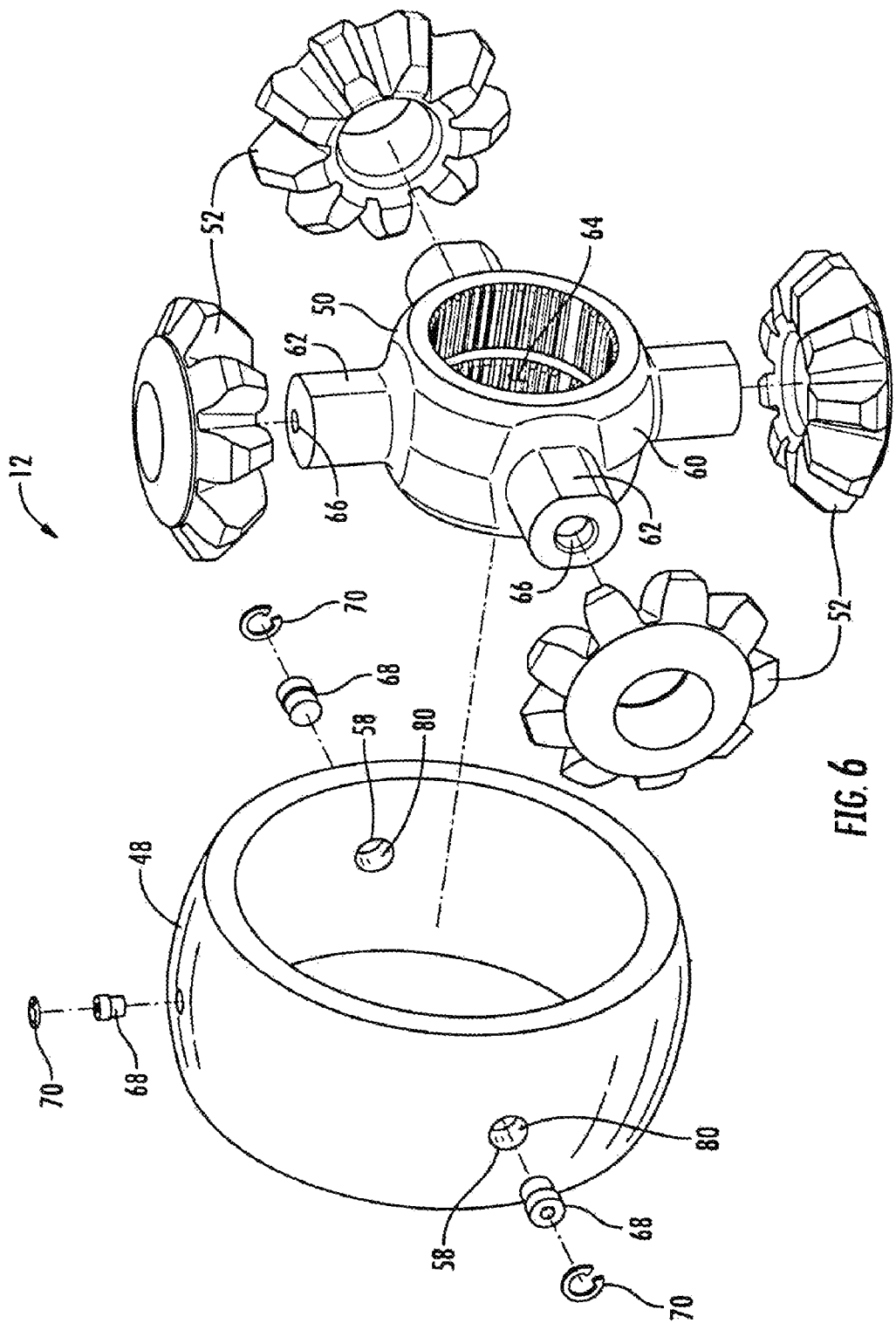
FIG. 6 is a schematic exploded view of the portion of the IAD assembly illustrated in FIGS. 4 and 5.

As more clearly illustrated in FIG. 6, the body 60 of the spider 50 has a plurality of legs 62 extending radially outwardly therefrom. In certain embodiments, the spider 50 has an array of four legs 62 extending radially outward from the body 60, each of the legs 62 spaced 90 degrees apart from each other. It is understood that the spider 50 may have any number and size of legs 62 and that the legs 62 may be spaced apart at various distances and formed at various angles as desired.

One or more of the legs 62 of the spider 50 may include openings 66 formed in ends thereof. In certain embodiments shown in FIGS. 2 and 3, the legs 62 with the openings 66 are oppositely positioned from each other. In other embodiments shown in FIG. 6, two of the legs 62 include the openings 66, wherein the legs 62 are spaced apart by about 90 degrees. In other embodiments, three or four of the legs 62 may include the openings 66. The apertures 58 formed in the IAD case 48 may be aligned with the openings 66 when the IAD case 48 is positioned around the spider 50. In some embodiments, the openings 66 formed in the ends of the legs 62 of the spider 50 may be threaded, if desired.

One of the pinion gears 52 may be mounted on each of the legs 62 of the spider 50. Preferably, the ends of the legs 62 are received in the respective center bore of the pinion gears 52. In some embodiments, four of the pinion gears 52 are mounted on four of the legs 62 of the spider 50.

Each of the pinion gears 52 and the spider 50 may be secured within the IAD case 48 by at least one locking mechanism 54. The locking mechanism 54 ensures positive locking of the IAD case 48 and militates against the IAD case 48 from contacting and prematurely damaging adjacent gears such as the helical side gear assembly 24, the pinion gears 52, and the output side gear 46, for example, during operation. The locking mechanism 54 may be configured to secure the IAD case 48 around one or more components of the IAD assembly 12. In certain embodiments, each of the locking mechanisms 54 is disposed through at least one of the apertures 58 in the IAD case 22 and into at least one of the opening 66 formed in the legs 62 of the spider 50. As shown in FIG. 2, two of the locking mechanisms 54 are disposed though two of the apertures 58 in the IAD case 22 and into two of the openings 66 formed in the legs 62 of the spider 50, wherein the two apertures 58 are located about 180 degrees from one another. In certain instances, the threaded opening 66 may allow for easier removal of the locking mechanism 54 therefrom.

In the embodiment illustrated in FIG. 2, the locking mechanism 54 includes a fastening element 68 integrally formed with a head cap 70 (e.g. threaded bolt or screw). In other embodiments, the locking mechanism 54 may be a fastener such as clamp, a clasp, a clip, a latch, a nail, a retaining ring, a strap, and the like, for example.

Figure 5:
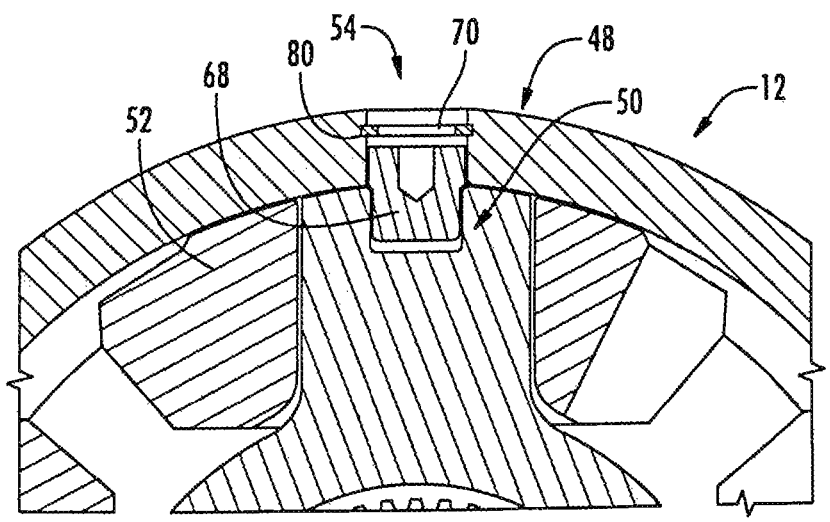
FIG. 5 is a schematic enlarged fragmentary perspective view of a portion of the IAD assembly illustrated in FIG. 4.

In the embodiment shown in FIGS. 4-6, each of the locking mechanisms 54 is a multi-piece component configured to be selectively inserted into the openings 66 of the spider 50. Preferably, each of the multi-piece locking mechanisms 54 includes a fastening element 68 (e.g. screw/dowel pin) and a separate corresponding retaining element 70 (e.g. snap ring). It is understood that the fastening element 68 may be a screw, a dowel, a pin, a rod, and the like. As more clearly shown in FIG. 5, the fastening element 68 is disposed through the aperture 58 in the IAD case 22 and into the opening 66 formed in the leg 62 of the spider 50, and the retaining element 70 is received into the groove 80 formed in the IAD case 48. It is understood that the retaining element 70 may be a retaining ring, a locking ring, a snap ring, a clamp, a latch, a strap, a clip, a snap cap, a closing plate, and the like. As illustrated in FIG. 6, the IAD assembly 12 includes three of the multi-piece locking mechanisms 54 located about 90 degrees from one another.

Figure 7:
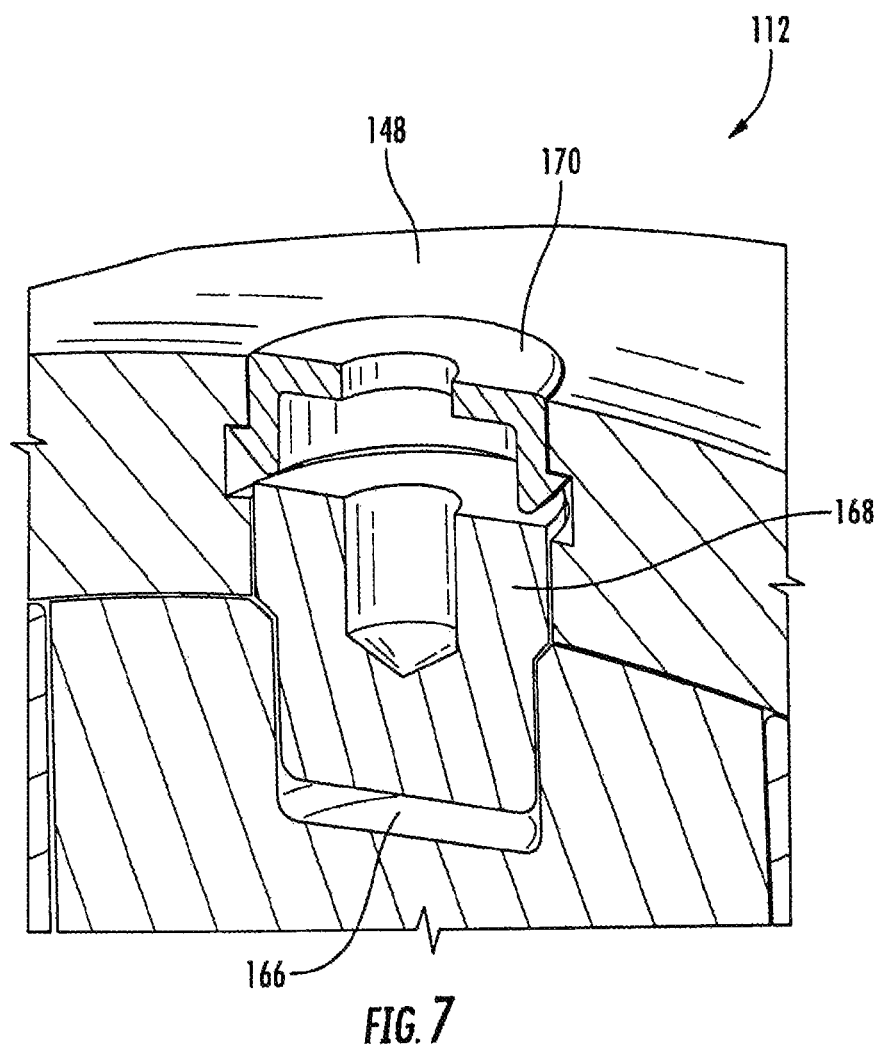
FIG. 7 is a schematic enlarged fragmentary perspective view of a portion of an IAD assembly according to another embodiment of the disclosure.
Figure 8:
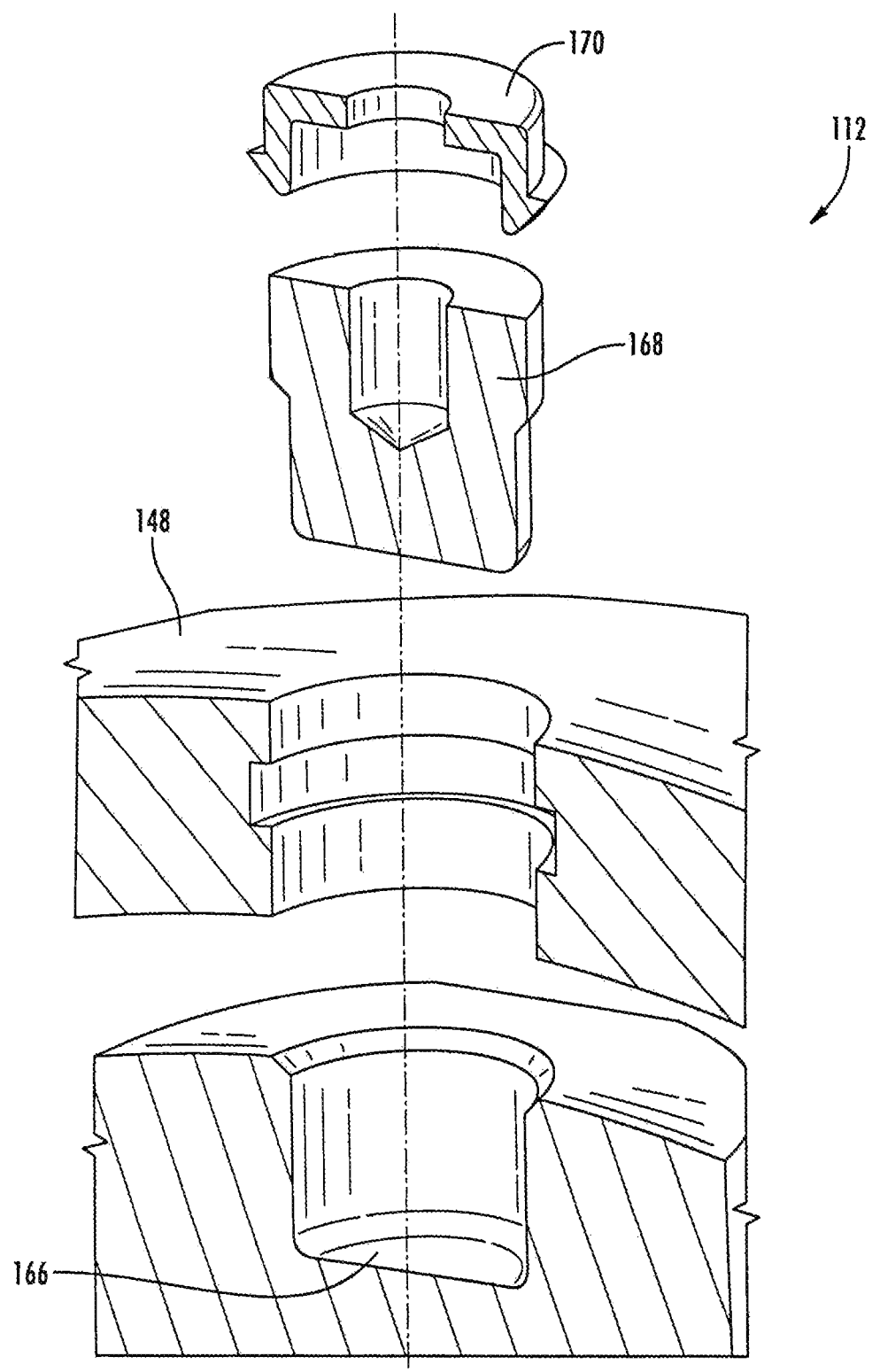
FIG. 8 is a schematic enlarge fragmentary exploded view of the portion of the IAD assembly illustrated in FIG. 7.

FIGS. 7 and 8 shows an IAD assembly 112 according to another embodiment of the disclosure. The IAD assembly 112 has one or more locking mechanisms. Each of the locking mechanisms is a multi-piece component configured to be selectively inserted into one or more of the openings 66 of the spider 50. Preferably, each of the multi-piece locking mechanisms includes a fastening element 168 (e.g. screw) and a separate corresponding retaining element 170 (e.g. snap cap). The fastening element 168 may be a screw, a dowel, a pin, a rod, and the like. As more clearly shown in FIG. 7, the fastening element 168 is disposed through the aperture in the IAD case 148 and into the opening 166 formed in the leg of the spider, and the retaining element 170 is received into the groove formed in the IAD case 148. The retaining element 170 may be produced from a variety of suitable materials such as a metal material or a plastic material, for example. It is understood that the retaining element 170 may be a retaining ring, a locking ring, a snap ring, a clamp, a latch, a strap, a clip, a snap cap, a closing plate, and the like. It should be appreciated that the IAD assembly 112 may include any number, size, and configuration of the locking mechanism as desired.

Figure 9:
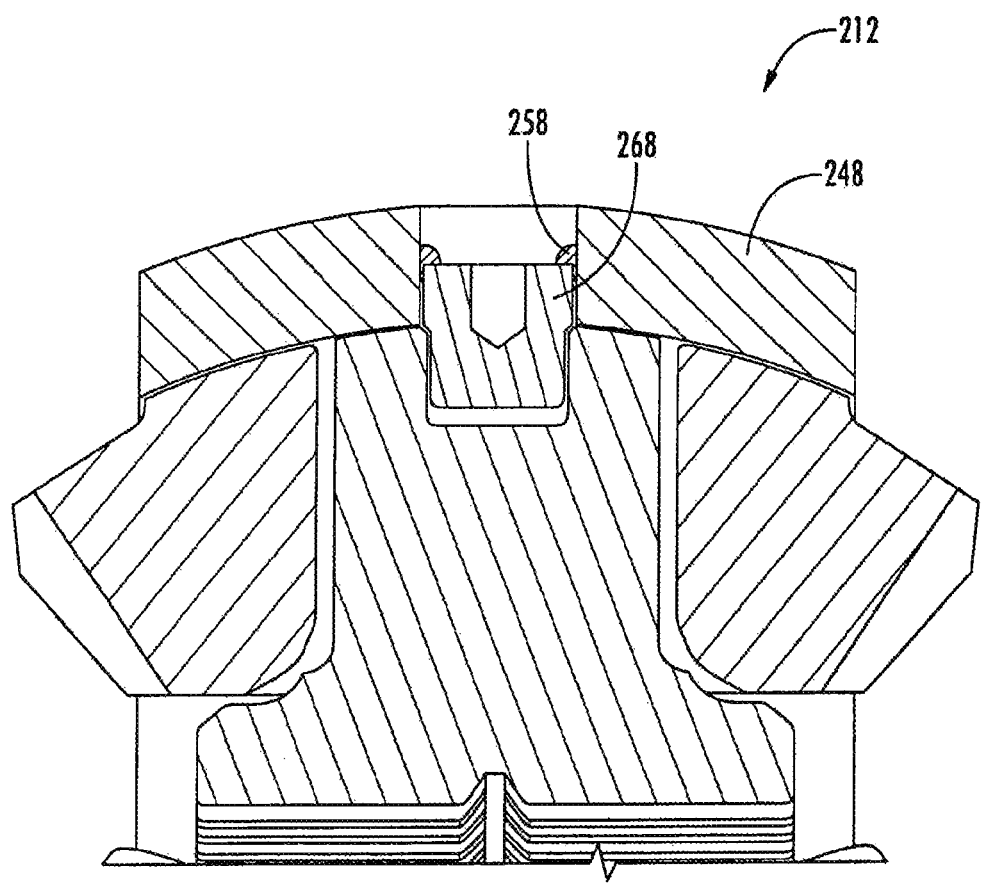
FIG. 9 is a schematic perspective view of a portion of an IAD assembly according to another embodiment of the disclosure.

In another embodiment of an IAD assembly 212 of the present disclosure, the locking mechanism includes a fastening element 268 fixedly connected to an IAD case 248 by a weld 258, as shown in FIG. 9. In this embodiment, the IAD assembly 212 includes one locking mechanism to maintain a position of the IAD case 248 and militate against the IAD case 248 from contacting and prematurely damaging the adjacent gears such as a helical side gear assembly, pinion gears, and an output side gear, for example, during operation. Various other methods of joining and securing the locking mechanism together with the IAD case 248 may be employed.

Figure 10:
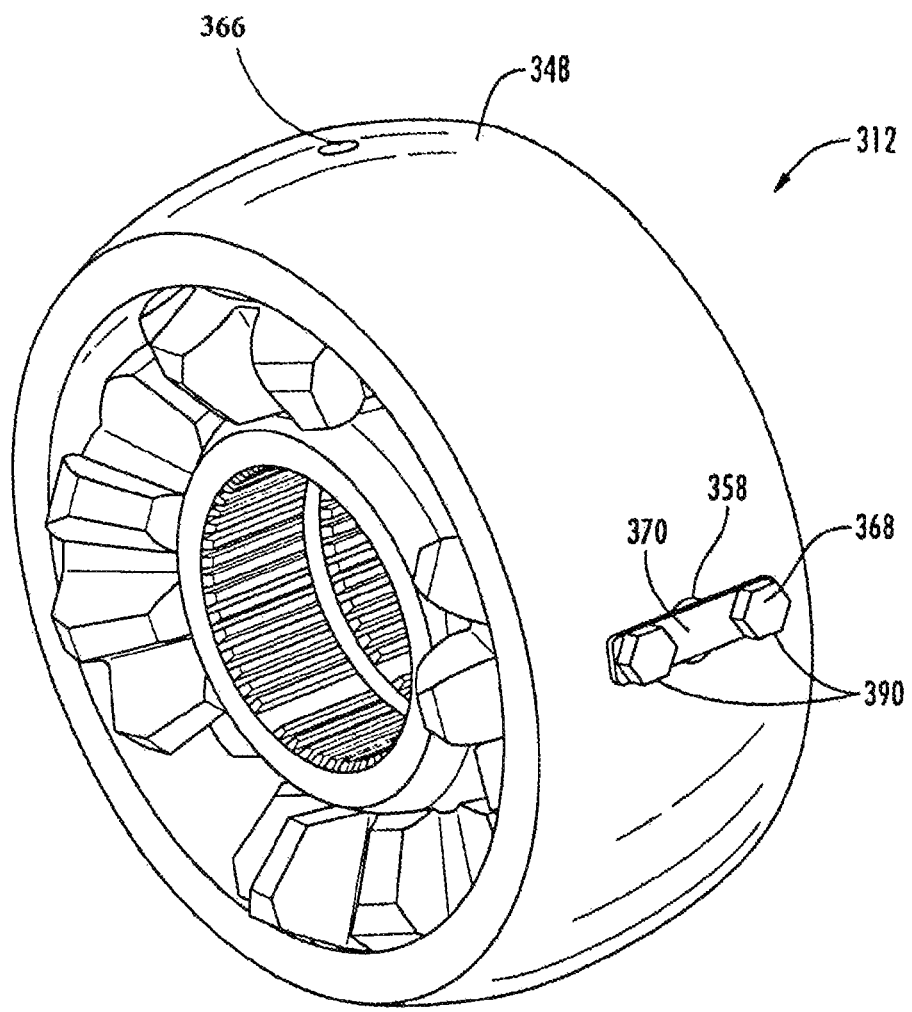
FIG. 10 is a schematic plan view of a portion of an IAD assembly according to another embodiment of the disclosure.

FIG. 10 shows an IAD assembly 312 including at least one locking mechanism 368 according to yet another embodiment of the disclosure. Each locking mechanisms 368 is a multi-piece component configured to be selectively inserted into the openings of the spider. Preferably, each of the multi-piece locking mechanisms 368 includes a fastening element (e.g. screw/dowel pin) and a separate corresponding retaining element. The fastening element is disposed through the aperture 358 in the IAD case 348 and into the opening formed in the leg of the spider. As illustrated in FIG. 10, the retaining element 370 includes a pair of fasteners 390 and a closing plate 370 positioned on top of as a closure to the aperture 358 of the IAD case 348. In certain embodiments, the closing plate 370 may span across the aperture 358 and interconnect the fasteners 390. A threaded locker may also be applied to the locking plate 370.

It is understood that the locking mechanism of each of the embodiments of the disclosure described herein may further include a locker. Various lockers may be employed such as a liquid locking fluid, a thread locker, and the like, for example. The locker may be used to enhance locking capabilities and militate against disengagement of the locking mechanism. In certain embodiments, the locker may be deposited inside at least one of the apertures of the IAD case and the openings of the spider prior to disposing of the fastening element of the locking mechanism therein. The locker enhances a positive locking of the fastening element in the IAD assembly.

In order to assemble the IAD assembly 12, 112, 212, 312 disclosed herein, one or more of the pinion gears 52 are first assembled onto one or more of the legs 62 of the spider 50. Next, the IAD case 48 is positioned around the spider 50 such that the apertures 58 in the IAD case 48 are precisely aligned with the openings 66 in the spider 50. One or more of the fastening elements 68 are then inserted into one or more of the openings 66 and tightened or pressed down in the openings 66, as needed.

Employing the locking mechanism with the IAD assembly 12, 112, 212, 312 provides balance and symmetry to various components of the tandem axle assembly 10, such as the helical side gear assembly 24, the clutch assembly 26, and the output side gear 46. As a result, there is less friction and wear on these components. An outer portion of the helical side gear assembly 24 and the output side gear 46 are prevented from contacting with and rubbing against the IAD case 48.

It is within the scope of this disclosure that the IAD assembly having a locking mechanism for an IAD case can be used in an axle assembly of a tandem axle assembly, a tridem axle assembly, a single axle assembly, and/or an electric axle assembly. Additionally, it is within the scope of this disclosure, and as a non-limiting example, that the IAD assembly with the locking mechanism for the IAD case disclosed herein may be used in automotive, off-road vehicle, all-terrain vehicle, construction, and structural applications. Such IAD assemblies disclosed herein may also be used in passenger vehicle, electric vehicle, hybrid vehicle, commercial vehicle, autonomous vehicles, semi-autonomous vehicles and/or heavy vehicle applications.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:
1. An inter-axle differential (IAD) assembly, comprising:
a case;
a spider disposed within the case, the spider including a ring-shaped body having a center bore formed therethrough, wherein the body includes a plurality of outwardly extending legs;
a plurality of gears disposed within the case such that the case surrounds the spider and the gears, wherein at least one of the gears is disposed on at least one of the legs of the spider; and
at least one locking mechanism configured to maintain a position of the IAD case, wherein the at least one locking mechanism secures the IAD case to the spider, and wherein at least one of the legs of the spider includes an opening formed therein to receive at least a portion of the at least one locking mechanism therein.

2. The IAD assembly according to claim 1, wherein the case includes at least one aperture formed therein to receive at least a portion of the at least one locking mechanism therethrough.

3. The IAD assembly according to claim 1, wherein the locking mechanism includes a fastening element configured to be received in at least one of the case and the spider.

4. The IAD assembly according to claim 3, wherein the fastening element is one of a threaded fastener, a dowel, a pin, and a rod.

5. The IAD assembly according to claim 3, wherein the fastening element is connected to the case by a weld.

6. The IAD assembly according to claim 3, wherein the locking mechanism further includes a retaining element configured to maintain a position of the fastening element.

7. The IAD assembly according to claim 6, wherein the retaining element is one of a retaining ring, a locking ring, a snap ring, a clamp, a latch, a strap, a clip, a snap cap, and a closing plate.

8. The IAD assembly according to claim 1, wherein the locking mechanism further includes a locker to militate against disengagement of the locking mechanism.

9. An inter-axle differential (IAD) assembly, comprising:
a case having at least one aperture extending therethrough, wherein the case further includes a groove formed in an inner surface defining the at least one aperture;
a spider disposed within the case, the spider having a plurality of outwardly extending legs, wherein at least one of the legs includes at least one opening formed in an outward end thereof;
a plurality of gears disposed within the case, wherein at least one of the gears is disposed on at least one of the legs of the spider; and
at least one locking mechanism configured to maintain a position of the IAD case, wherein the at least one locking mechanism includes a fastening element, and wherein the fastening element is at least partially disposed in the at least one aperture formed in the case and the at least one opening formed in the spider.

10. The IAD assembly according to claim 9, wherein the case is a unitary structure.

11. A method of assembling an inter-axle differential (IAD) assembly, the method comprising:
providing a case;
providing a spider including a ring-shaped body having a center bore formed therethrough, wherein the body includes a plurality of outwardly extending legs;
providing a plurality of gears;
providing at least one locking mechanism configured to maintain a position of the IAD case;
disposing each of the gears on a respective one of the legs of the spider;
positioning the spider having the gears disposed on the legs thereof within the case such that the case surrounds the spider and the gears; and
securing the case to the spider using the at least one locking mechanism, wherein at least one of the legs of the spider includes an opening formed therein to receive at least a portion of the at least one locking mechanism therein.

12. The method according to claim 11, wherein the case includes at least one aperture formed therein to receive at least a portion of the at least one locking mechanism therethrough.

13. The method according to claim 11, wherein the locking mechanism includes a fastening element configured to be received in at least one of the case and the spider.

14. The method according to claim 13, further comprising welding the fastening element to the case.

15. The method according to claim 13, wherein the locking mechanism further includes a retaining element configured to maintain a position of the fastening element.

16. The method according to claim 11, further comprising applying a locker to militate against disengagement of the locking mechanism.

* * * * *